US008382994B2

(12) United States Patent
Stolarik et al.

(10) Patent No.: US 8,382,994 B2
(45) Date of Patent: Feb. 26, 2013

(54) METHOD OF PREPARING A COMPOSITE PRESSURE VESSEL FOR USE AS A WATER TREATMENT APPARATUS

(75) Inventors: Douglas S. Stolarik, Mentor, OH (US); Douglas M. Horner, Gates Mills, OH (US); Michael P. Mormino, Aurora, OH (US)

(73) Assignee: Enpress LLC, Eastlake, OH (US)

( * ) Notice: Subject to any disclaimer, the term of this patent is extended or adjusted under 35 U.S.C. 154(b) by 321 days.

(21) Appl. No.: 12/651,235

(22) Filed: Dec. 31, 2009

(65) Prior Publication Data

US 2010/0101658 A1 Apr. 29, 2010

Related U.S. Application Data

(63) Continuation-in-part of application No. 11/834,151, filed on Aug. 6, 2007, now Pat. No. 7,901,576.

(51) Int. Cl.
*B01D 24/12* (2006.01)
*B01D 24/46* (2006.01)

(52) U.S. Cl. ........................................ 210/793; 210/807

(58) Field of Classification Search ...... 141/9; 210/288, 210/289, 807, 285, 317, 499, 489, 793, 279, 210/787

See application file for complete search history.

(56) References Cited

U.S. PATENT DOCUMENTS

| | | | | |
|---|---|---|---|---|
| 2,593,198 | A * | 4/1952 | Rutherford, Jr. | 210/488 |
| 3,534,856 | A | 10/1970 | Marsh | |
| 3,557,827 | A | 1/1971 | March | |
| 3,662,780 | A | 5/1972 | Marsh | |
| 4,228,000 | A | 10/1980 | Hoeschler | |
| 5,089,140 | A | 2/1992 | Brane et al. | |
| 5,147,530 | A | 9/1992 | Chandler et al. | |
| 5,157,979 | A | 10/1992 | Brane et al. | |
| 5,378,370 | A | 1/1995 | Brane et al. | |
| 6,887,373 | B2 | 5/2005 | McCoy | |
| 7,025,880 | B2 | 4/2006 | Lamb | |
| 7,354,495 | B2 | 4/2008 | Carter et al. | |
| 7,413,649 | B2 * | 8/2008 | Bittner | 210/108 |
| 2003/0136720 | A1 | 7/2003 | Lamb | |
| 2006/0060289 | A1 | 3/2006 | Carter et al. | |

FOREIGN PATENT DOCUMENTS

| | | |
|---|---|---|
| DE | 1945659 A1 | 3/1971 |
| WO | 00/66264 | 11/2000 |
| WO | 03/031860 A1 | 4/2003 |

* cited by examiner

*Primary Examiner* — Matthew Savage

(74) *Attorney, Agent, or Firm* — Rankin, Hill & Clark LLP

(57) ABSTRACT

The present invention provides a composite pressure vessel containing a distributor plate. The distributor plate comprises a thermoplastic polymeric disk having a top side, a bottom side, a perimeter edge and a central opening. The disk is provided with a plurality of radial slits, which define fluid flow passages through the disk between the central opening and the perimeter edge. The fluid flow passages through the disk are adapted to swirl fluid flowing through the disk from the bottom side to the top side such that it swirls around the central opening. The perimeter edge of the distributor plate is joined to an inner side of a thermoplastic liner during or immediately after the thermoplastic liner is formed by a blow-molding process or a rotational molding process.

9 Claims, 7 Drawing Sheets

FIG. 1
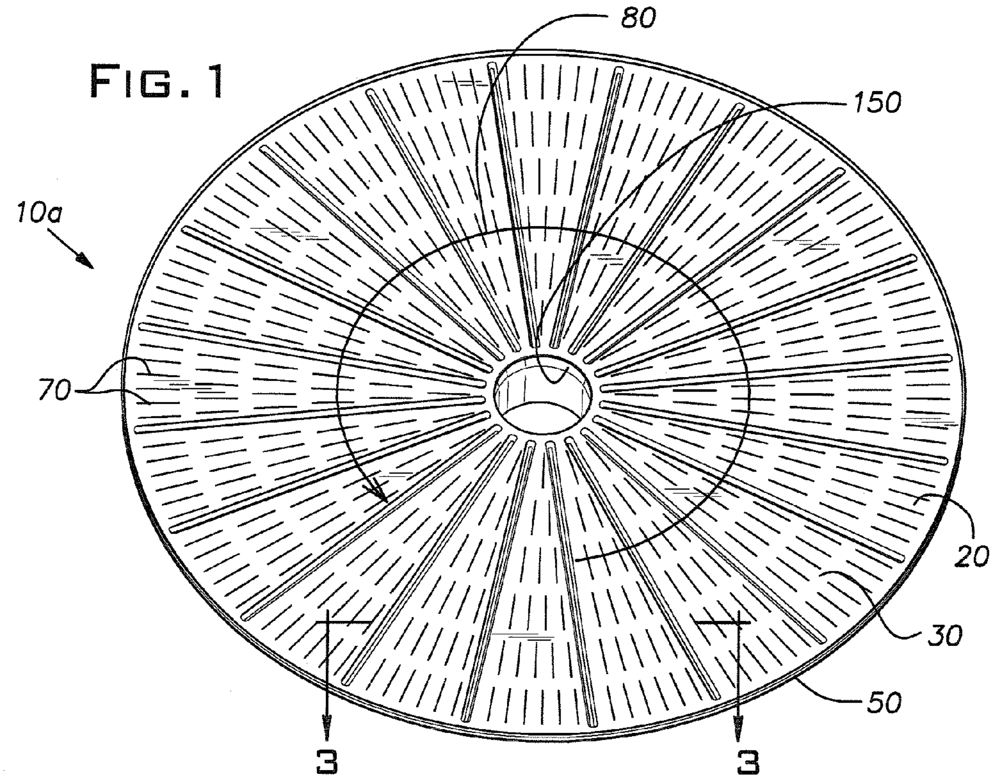
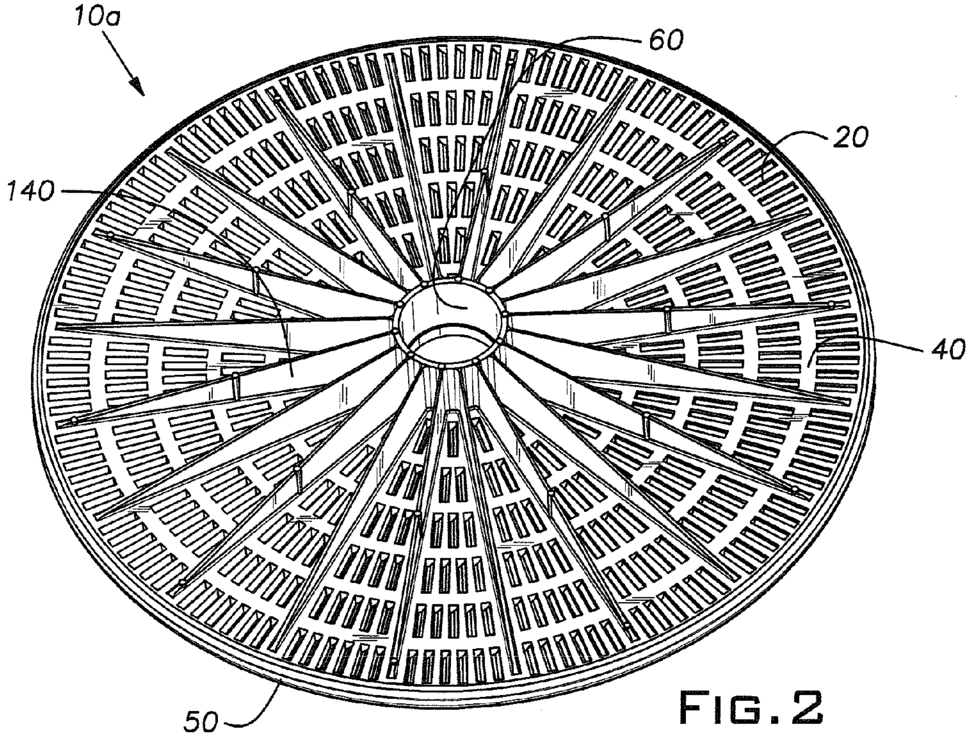
FIG. 2

METHOD OF PREPARING A COMPOSITE PRESSURE VESSEL FOR USE AS A WATER TREATMENT APPARATUS

CROSS-REFERENCE TO RELATED APPLICATIONS

This application is a continuation-in-part of U.S. App. Ser. No. 11/834,151, filed Aug. 6, 2007, now U.S. Pat. No. 7,901,576.

BACKGROUND OF INVENTION

1. Field of Invention

The present invention relates to a composite pressure vessel assembly containing at least one distributor plate, methods for manufacturing a composite pressure vessel containing at least one distributor plate and a method for preparing a composite pressure vessel that includes at least one distributor plate for use in water treatment applications.

2. Description of Related Art

Composite pressure vessels are used in a variety of applications including, for example, in the treatment and/or conditioning of water (e.g., water softeners). Composite pressure vessels used in such applications typically comprise an elongate thermoplastic liner or tank that has been over-wrapped with a reinforcing layer. The elongate thermoplastic liner is typically formed of one or more olefin polymers such as polypropylene and/or polyethylene, and is fabricated into a tank structure using a blow molding, rotational molding, spin-welding or other thermoplastic fabrication process. The reinforcing layer typically comprises glass filaments that are wrapped helically and circumferentially around the thermoplastic liner. The glass filaments are typically consolidated together and adhered to the thermoplastic liner using a thermosetting epoxy composition but, as disclosed in Carter et al., Pub. No. US 2006/0060289 A1, can be consolidated and adhered to the thermoplastic liner using commingled thermoplastic fibers.

In many prior art water treatment system applications, a dip tube (also sometimes referred to in the art as a distributor pipe or a supply pipe) having a distributor basket attached at one end is inserted through an aperture in a top end of the composite pressure vessel such that the distributor basket is disposed proximal to the bottom end of the composite pressure vessel. Examples of water treatment systems of this type are disclosed in Hoeschler, U.S. Pat. No. 4,228,000, Chandler et al., U.S. Pat. No. 5,147,530 and McCoy, U.S. Pat. No. 6,887,373 B2. The distributor basket in such prior art devices generally includes a plurality of narrow slits, which allow water that has flowed through water treatment media disposed in the composite pressure vessel and thereby treated to flow out of the pressure vessel through the dip tube. The slits are dimensioned to prevent water treatment media from flowing into the dip tube with the treated water. During initial assembly of such devices, once the dip tube is properly positioned within the composite pressure vessel, water treatment media is placed into the composite pressure vessel to surround the distributor basket and dip tube and hold it in position. The open end of the dip tube is then attached to a valve assembly, which is secured to the top end of the composite pressure vessel to seal off the aperture. Water to be treated is pumped into the top of the composite pressure vessel, where it flows through the water treatment media and is thereby treated. The treated water flows from the water treatment media to the distributor basket, where it passes through the slits in the distributor basket and back out of the composite pressure vessel through the dip tube to the valve assembly coupled thereto. Periodically, the flow of water is reversed to back wash and thereby condition the water treatment media.

Occasionally, it is necessary to service a composite pressure vessel (e.g., to add new water treatment media). In many cases, removal of the valve assembly disturbs the position of the dip tube. Water treatment media can settle beneath the disturbed distributor basket, making it difficult to re-secure the valve assembly to the top end of the composite pressure vessel and thus close the aperture. When this occurs, water is usually pumped at high pressure through the dip tube to flush the water treatment media away from the distributor basket until the dip tube can be properly repositioned in the water treatment media. Water pumped into the opened composite pressure vessel during this procedure flows out of the composite pressure vessel and onto the floor, where it creates a mess that can cause damage to the building structure in which the composite pressure vessel is installed. It also disturbs the water treatment media within the composite pressure vessel, which can adversely affect future water treatment performance.

Carter et al., U.S. Pat. No. 7,354,495, discloses a composite pressure vessel that utilizes one or more distributor plates (sometimes referred to therein as separators and/or fluid diffusers) instead of a distributor basket to prevent water treatment media from flowing into the dip tube during water treatment operations. The distributor plates divide the pressure vessel into regions and support the water treatment media within the composite pressure vessel. As noted in Carter et al., the distributor plates can be secured to the thermoplastic liner of the composite pressure vessel by conventional attachment techniques (e.g., laser welding, spin welding and hot plate welding) or can be mechanically fixed to structures within the interior of the composite pressure vessel. Prior art distributor plates have generally utilized mesh screens to prevent water treatment media from flowing through the distributor plate.

BRIEF SUMMARY OF THE INVENTION

The present invention provides a composite pressure vessel containing at least one distributor plate. The distributor plate comprises a thermoplastic polymeric disk having a top side, a bottom side, a perimeter edge and a central opening. The disk is provided with a plurality of radial slits, which define fluid flow passages through the disk between the central opening and the perimeter edge. The fluid flow passages through the disk are adapted to swirl fluid flowing through the disk from the bottom side to the top side such that it swirls around the central opening. A supply pipe can be engaged with the distributor plate at the central opening of the disk.

The perimeter edge of the distributor plate is joined to an inner side of a thermoplastic liner. In one embodiment of the invention, the thermoplastic liner is formed via a blow molding process and the perimeter edge of the distributor plate is joined to the inner side of the thermoplastic liner as the thermoplastic liner is formed. In another embodiment of the invention, the thermoplastic liner is formed via a rotational molding process and the perimeter edge of the distributor plate is joined to the inner side of the thermoplastic liner as the thermoplastic liner is formed.

The distributor plate can be used to support water treatment media. During water treatment operations, water flows through the water treatment media and through the disk from the top side to the bottom side. The radial slits in the disk promote near-fractal distribution of the water through the water treatment media. During backwashing operations, water pumped through the supply pipe diffuses through the radial slits in the distributor plate from the bottom side to the top side. The distributor plate causes the backwash water to swirl around the central opening and the supply pipe secured thereto. The swirling action of the backwash water through the water treatment media ensures that the backwashing water and regeneration chemicals make optimal contact with the water treatment media, thereby conditioning all of the water treatment media and ensuring that it remains properly distributed within the composite pressure vessel.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 1 is a perspective view showing a top side of an exemplary distributor plate according to the present invention.

FIG. 2 is a perspective view showing a bottom side of the distributor plate shown in FIG. 1.

DETAILED DESCRIPTION OF THE INVENTION

Figure 3:
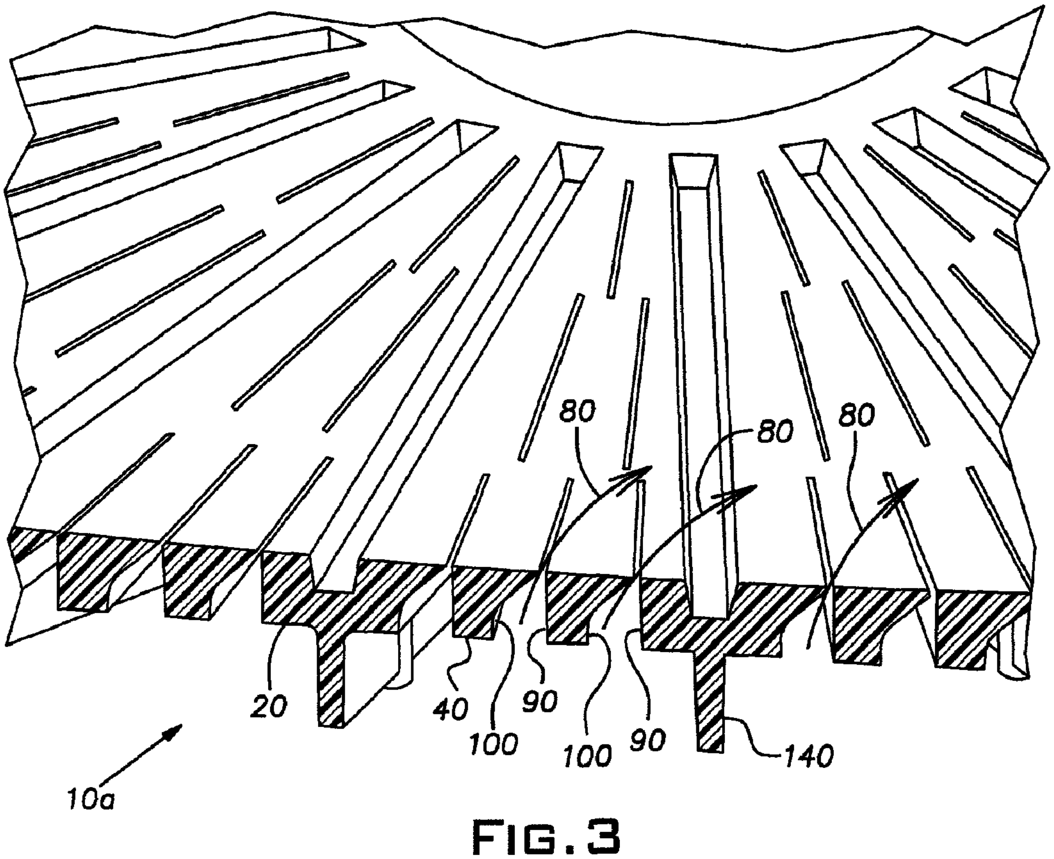
FIG. 3 is an enlarged section view of a portion of the distributor plate shown in FIG. 1 taken along the line III-III.

FIGS. 1-3 show views of an exemplary distributor plate 10*a* for a composite pressure vessel. The distributor plate 10*a* comprises a disk 20 having a top side 30, a bottom side 40, a perimeter edge 50 and a central opening 60. Fluid flow passages must be provided through the disk 20 to allow fluid to pass from the top side 30 to the bottom side 40 through the disk 20 and vice versa. The disk 20 is preferably formed of a thermoplastic polymeric material, but could be formed of other materials including, for example, thermosetting polymers, ceramics, corrosion-resistant metals and combinations thereof.

In the embodiment illustrated in FIGS. 1-3, radial slits 70 are formed in the disk 20 to define fluid flow passages through the disk 20 between the central opening 60 and the perimeter edge 50. The radial slits 70 are arranged in a plurality of concentric rings around the circumference of the central opening 60. The width of the radial slits 70 at the top side 30 of the disk 20 is not per se critical, but will be selected in view of the size of the water treatment media to be supported on the distributor plate 10*a*. Radial slits 70 having a width at the top side 30 of the disk 20 of about 0.006" (~0.1 mm) are presently preferred for use in water treatment vessel applications. As shown in FIG. 1, the radial slits have longitudinal axes that are radially-aligned with respect to a center of the central opening.

The top side 30 of the distributor plate is adapted to support water treatment media thereon. During water treatment operations, water flows through the water treatment media and then through the disk 20 from the top side 30 to the bottom side 40 through the fluid flow passages. In the illustrated embodiment, the radial slits 70 are distributed around the central opening 60 in the disk 20 in such a way that the water being treated generally flows in a straight line downwardly through the bulk of water treatment media supported by the top side 30 of the disk 20 before it passes through the radial slits 70. The radial slits 70 in the disk 20 promote near-fractal distribution of the water through the water treatment media. This prevents "coning", which is a problem in many prior art water treatment vessels. The term "coning" refers to the path water being treated in conventional water treatment vessels tends to take through the water treatment media toward the distributor basket attached to the end of the dip tube. "Coning" is disadvantageous because only a portion of the water treatment media is used to treat the water. Distributor plates with radial slits 70 eliminate "coning" and provide substantial improvements (typically >15%) in water treatment media bed life.

Preferably, the fluid flow passages through the disk 20 are also adapted to swirl fluid flowing through the disk from the bottom side 40 to the top side 30 in a first circular direction around the central opening 60, such as indicated by the flow arrows 80 in FIGS. 1 and 3. The fluid is preferably swirled around the central opening 60 in a counter-clockwise direction. This is highly advantageous during backwashing operations in which backwashing fluid is pumped through the supply pipe to flow upwardly through the water treatment media, thereby reconditioning the water treatment media. Ideally, the backwashing fluid flows evenly through the radial slits 70 and through the entire bulk of the water treatment media supported by the top side 30 of the disk. The swirling action of the water improves backwashing efficiency and further serves to reduce the likelihood of "coning".

The improvements in backwashing efficiency provide significant benefits in water treatment applications. In conventional water treatment applications (e.g., water softeners), a backwash flow rate of about 3 gallons of water per minute is typically required for a period of about 20 minutes in order to recondition the water treatment media. This results in about 60 gallons of regenerative chemical and salt-laden backwash water being discharged into a municipal sewer system or a septic system each time the water treatment media is reconditioned. The backwashing efficiency provided by distributor plates provided with radial slits permits a much lower backwashing flow rate to be used (e.g., about 1.5 gallons per minute) over the same or reduced period of time, which significantly reduces the amount of regenerative chemical and salt-laden backwash water discharged from the system during backwashing operations. It also reduces the amount of regenerative chemicals that must be used during the backwashing operations, and the amount of salt that is lost during backwashing operations. Over the lifetime of the water treatment apparatus, the present invention can save tens of thousands of gallons of water and significant quantities of regenerative chemicals and salt from being discharged into the environment as compared to conventional water treatment devices.

There are three factors that are likely responsible for the improvements in backwash flow rates and backwash efficiency provided by the present invention. The first factor is that there are fewer radial slits 70 (i.e., flow passages) provided through the disk 20 near the central opening 60 (through which a supply pipe 170 passes) than there are near the perimeter 50 of the disk 20. Fluids take the path of least resistance, and thus by managing the amount of open areas through the disk it is possible to direct or focus the flow of fluid across the disk 20 and thereby obtain near fractal distribution of the fluid through the entire disk 20. The second factor is the near perfect distribution of fluid flowing upwardly through the disk 20 and substantially uniformly across the entire surface of the disk 20 through the filter bed/media during backwashing operations. This essentially "uniformly fluidizes" the filter entire filter bed/media, even at dramatically reduced backwash flow rates as compared to conventional backwash flow rates. Conventional backwash flow rates must be kept comparatively higher in order to have any possibility of breaking up cone and gravel distribution schemes caused by flow channeling through the media. The third factor is the angled flow emitted from each radial slot 70. The angled or swirling flow effectively lifts and rotates the entire filter bed during backwashing operations, which eliminates channeling through the media at angles of 30° to 45°, as in conventional systems.

It will be appreciated that in some water treatment systems, the fluid flow directions are reversed (i.e., the service flow direction and the backwashing flow directions are the opposite as heretofore described). The invention provides advantages in both flow directions.

The diameter of the distributor plate 10*a* is not per se critical, but will be selected in view of the diameter of the portion of the thermoplastic liner to which the perimeter 50 of the distributor plate 10*a* is to be joined. The disk 20 should have a thickness sufficient to support water treatment media without deforming. It will be appreciated that composite pressure vessels having a larger diameter will generally need a stronger, thicker disk 20 than vessels having a smaller diameter. For most water treatment applications, a thickness of about 0.2" (5 mm) is considered sufficient. The thickness of the disk 20 can be reduced through the use of a flow-control support, as discussed in greater detail below.

There are several ways in which fluid flowing through the fluid flow passages in the disk 20 from the bottom side 40 to the top side 30 can be encouraged to swirl around the central portion 60 of the distributor plate 10*a*. For example, the fluid flow passages can have the same width as they pass through the thickness dimension of the disk 20, but be made to pass through the disk 20 at an angle other than a right angle with respect to the top side 30 (not shown). However, in view of the preferred very narrow width of the radial slit 70 openings in the top side 30 of the disk 20, this is not preferred.

More preferably, each of the radial slits 70 that define a fluid flow passage through the disk 20 is narrower in width at the top side 30 of the disk 20 than at the bottom side 40 of the disk 20. Thus, each of the fluid flow passages through the disk 20 is bounded by a first longitudinal sidewall 90 and a second longitudinal sidewall 100. The first longitudinal sidewall 90 is preferably substantially perpendicular to the top side 30 of the disk 20. However, the second longitudinal sidewall 100 has a concave profile in cross-section. As fluid is pumped through the fluid flow passages in the disk 20, the fluid follows along the contour of the concave second longitudinal sidewall 100 at a higher rate of speed that water flowing along the first longitudinal sidewall 90, thus causing the water to exit through the radial slit 70 at the top side 30 of the disk 20 in a direction other than perpendicular to the top side 30 of the disk 20. Because the radial slits 70 are arranged circumferentially around the disk 20, the radial slits 70 collectively serve to impart a swirling motion to fluid flowing through the fluid flow passages in the disk 20.

It will be appreciated that the second longitudinal sidewall 100 need not have a concave profile in cross-section, as illustrated in FIG. 3. Alternatively, the second longitudinal sidewall could have a planar profile in cross-section, which is angled with respect to the first longitudinal sidewall 90. Alternatively, the second longitudinal sidewall could have a convex profile in cross-section. But, a concave profile in cross-section is preferred.

In a preferred embodiment of the invention, the distributor plate 10*a* further comprises a plurality of radial reinforcing fins 140, which extend from the bottom side 40 of the disk 20 between the perimeter edge 50 and the central opening 60 through the disk 20. The radial reinforcing fins 140 need not be linear, but can spiral away from the central opening 60 to further impart swirling motion to the fluid during backwashing operations. The central opening 60 through the disk 20 is preferably bounded by a collar having a height that is greater than the thickness dimension of the disk 20 at the perimeter edge 50. Thus, the radial reinforcing fins 140 attached to an outer side of the collar taper as they extend from the collar toward the perimeter edge 50.

Figure 4:
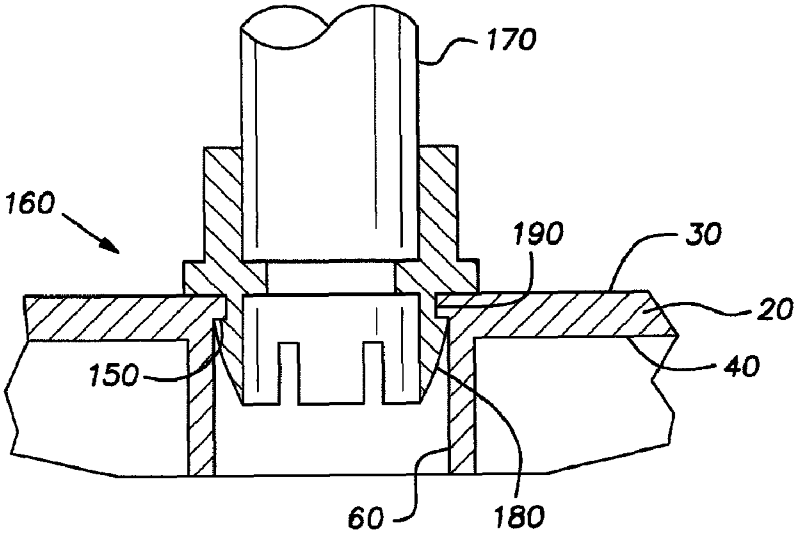
FIG. 4 is a front section view taken through the center of a snap fitting according to the invention engaged with an upper retaining ring of a distributor plate.
Figure 7:
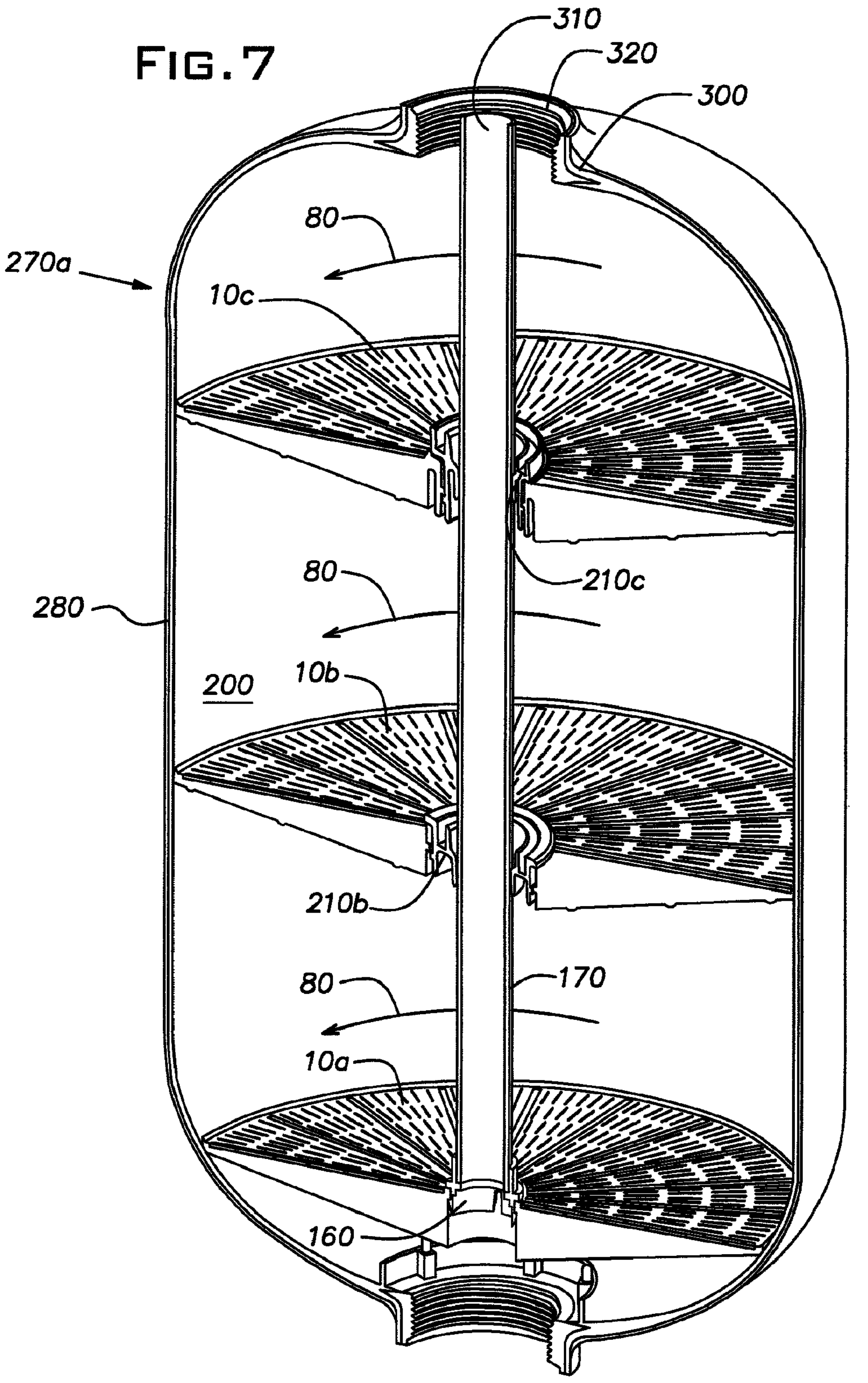
FIG. 7 is a perspective view showing the front of a section taken through the longitudinal axis of an exemplary composite pressure vessel according to the invention.

An upper retaining ring 150 is preferably provided about the central opening 60 for engaging a fitting such as, for example, a snap-fitting 160 (shown in FIG. 4) attached to an end of a supply pipe 170 (shown in FIG. 7). The snap-fitting 160 includes a plurality of deflectable tabs 180, which deflect inwardly as the snap-fitting 160 is pressed into the central opening 60 in the disk 20. The deflectable tabs 180 are biased to spring back after they pass the upper retaining ring 150, thereby capturing the upper retaining ring 160 in a channel 190 formed in the snap-fitting 160. Engagement of the snap-fitting to the disk 20 is substantially permanent. It takes more force to withdrawn the snap-fitting 160 from the disk 20 than is customarily applied to the supply pipe 170 during servicing of the composite pressure vessel. Thus, composite pressure vessels can be serviced without concern that the supply pipe 170 will become dislodged or otherwise displaced with respect to the disk 20. It will be appreciated that other fittings, such as tongue and groove or bayonet locking adapters could be used.

In some applications, it may be desirable to join one or more second distributor plates 10*b*, 10*c* (etc.) to an inner side wall 200 of a thermoplastic 280 (see FIG. 7) above the first distributor plate 10*a*. The second distributor plates 10*b*, 10*c* (etc.) can also be used to support water treatment media, which may be the same or different than the water treatment media supported by the first distributor plate 10*a*. Compartmental separation of different types of water treatment media can improve their performance and service life and negate the need for a second pressure vessel.

The second distributor plates 10*b*, 10*c* (etc.) preferably have the same general features and characteristics as the first distributor plate 10*a* described above. In other words, they comprise thermoplastic polymeric disks 20 having a top side 30, a bottom side 40, a perimeter edge 50 and a central opening 60, which are provided with radial slits 70 that define fluid flow passages through the disk 20 between the central opening 60 and the perimeter edge 50. One difference, however, is that the diameter of the central opening in the second distributor plates 10*b*, 10*c* (etc.) must be sufficiently larger in diameter than the diameter of the supply pipe 170 in order to facilitate disposing water treatment media past the second distributor plates 10*b*, 10*c* (etc.) to the be supported by the first distributor plate 10*a* (and/or lower second distributor plates). Once the water treatment media has passed the second distributor plates 10*b*, 10*c* (etc.), an access plate or fitting can be installed to close the gap or open space between the supply pipe 170 and the central opening in the second distributor plates 10*b*, 10*c* (etc.).

Figure 5:
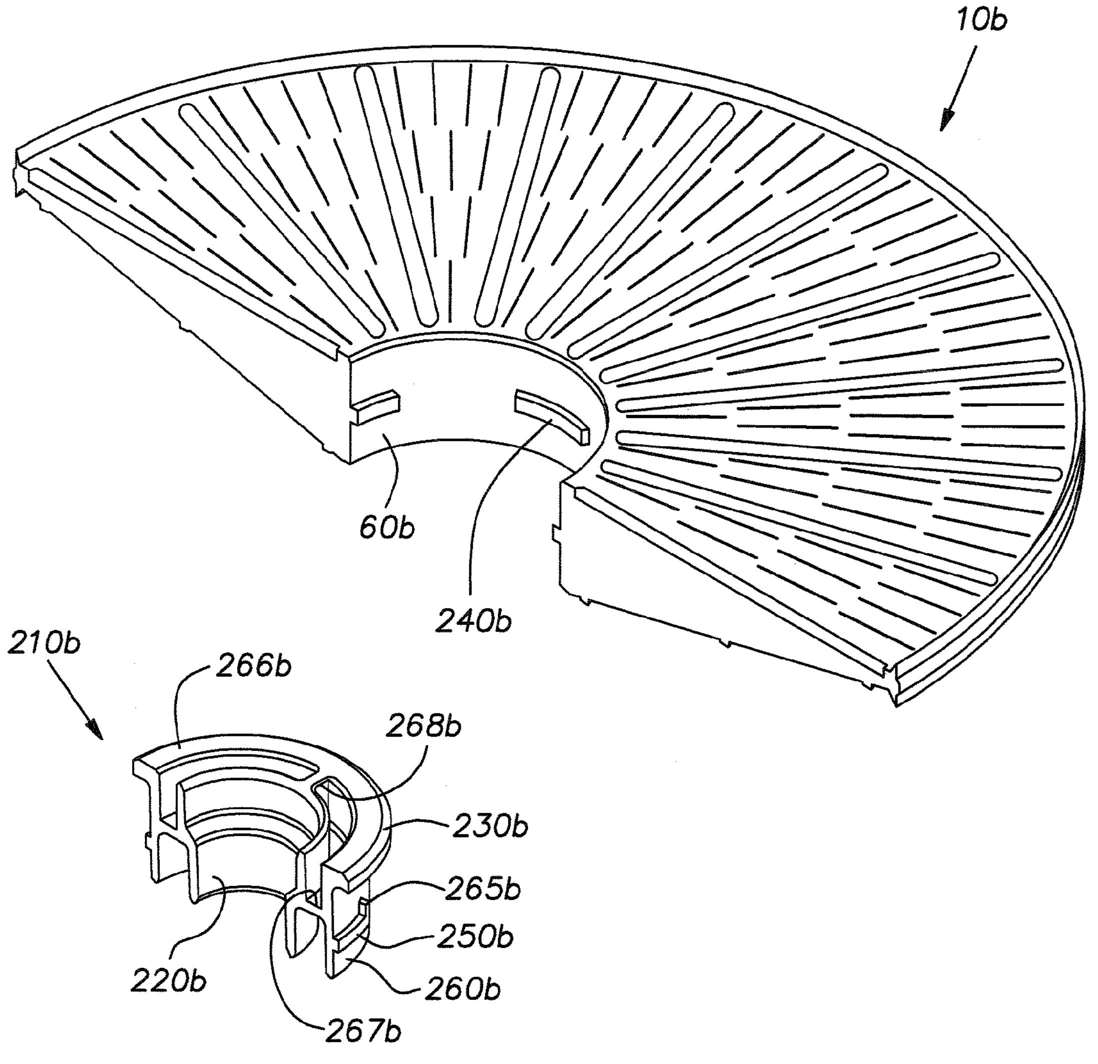
FIG. 5 is an exploded perspective front section view taken through the center of one exemplary adapter and corresponding second distributor plate according to the present invention.

FIG. 5 shows an exploded perspective front section view taken through the center of an exemplary access plate 210*b* and corresponding second distributor plate 10*b* according to the present invention. The access plate 210*b* includes an axial opening 220*b* that is dimensioned to sealingly surround the supply pipe 170 (shown in FIG. 7) and an outer perimeter portion 230*b* that is adapted to cover and thereby close off the gap or open space between the supply pipe 170 and the central opening 60*b* in the second distributor plate 10*b* through which the water treatment media can pass during a filling operation.

In the embodiment illustrated in FIG. 5, the second distributor plate 10*b* includes a plurality of discontinuous raised thread sections 240*b* disposed in the central opening 60*b*. The raised thread sections 240*b* preferably lie in a plane that is parallel to the top side 30*b* of the second distributor plate 10*b* and bisects the height of the collar. The access plate 210*b* also includes a plurality of discontinuous raised thread sections 250*b*, which extend from an outer portion 260*b* of access plate 210*b*. The discontinuous thread sections 250*b* formed on the access plate 210*b* are adapted to pass between and slightly past the discontinuous thread sections 240*b* formed on the second distributor plate 10*b*. Rotation of the access plate 210*b* relative to the second distributor plate 10*b* causes the raised thread sections 250*b* to pass over the raised thread sections 240*b*, thereby locking the access plate 210*b* to the second distributor plate 10*b*. A stop 265*b* can be formed on the raised thread sections 250*b* (or the 240*b*) to limit rotation of the access plate 210*b* with respect to the second distributor plate 10*b*.

A top portion 266*b* of the access plate 210*b* preferably defines an annular channel 267*b*, which is interrupted by vertical segments 268*b*. This structure facilitates locking the access plate 210*b* to the second distributor plate 10*b* through the use of a tool (not shown) having prongs that extend into the annular channel 267*b*.

In the embodiment shown in FIG. 5, the central opening 60*b* in the second distributor plate 10*b* is relatively large in diameter. Accordingly, the access plate 210*b* is also correspondingly large in diameter. To strengthen the access plate 210*b*, a double-wall construction can be utilized, with an inner wall defining the axial opening 220*b* and the outer wall defining the outer portion 260*b* of the second access plate 210*b*.

Figure 6:
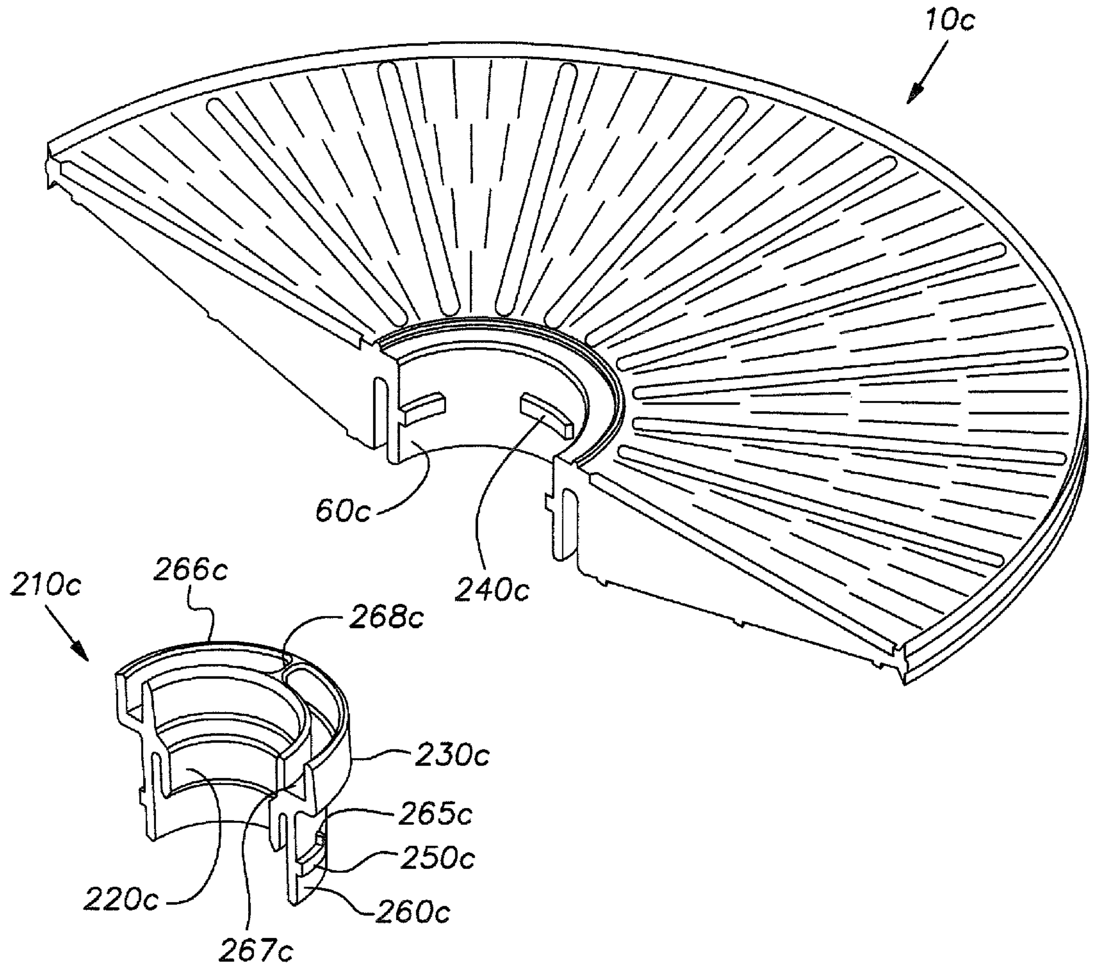
FIG. 6 is an exploded perspective front section view taken through the center of another exemplary adapter and corresponding second distributor plate according to the present invention.

FIG. 6 shows an exploded perspective front section view taken through the center of an alternative embodiment of an access plate 210*c* and corresponding second distributor plate 10*c* according to the present invention. Like reference numbers are used to identify similar elements ("c" is used instead of "b"). In the embodiment shown in FIG. 6, the central opening 60*c* in the second distributor plate 10*c* is smaller in diameter than the central opening 60*b* in the second distributor plate 10*b* shown in FIG. 5, but larger than the diameter of the supply pipe 170. Access plate 210*c* can pass through the central opening 60*b* in second distributor plate 10*b*. However, the top portion 266*c* of the access plate 210*c* preferably defines an annular channel 267*c* interrupted by vertical segments 268*c* that is the same size as the annular channel 267*b* in the access plate 210*b* shown in FIG. 5. Thus, the same tool used to lock access plate 210*b* to second distributor plate 10*b* can be used to lock access plate 210*c* to second distributor plate 10*c*.

The distributor plates are preferably formed of a thermoplastic polymer such as, for example, olefin polymers (e.g., polypropylene, polyethylene and particularly copolymers thereof). It will be appreciated, however, that virtually any polymeric material that can be joined to the thermoplastic liner 280 can be used. The snap-fitting 160 and/or the access plate(s) 210 can also be formed of the same material, but can also be formed of other corrosion resistant polymeric materials, if desired.

FIG. 7 shows a cross-section view of an exemplary water treatment vessel 270*a* according to the invention. The water treatment vessel 270*a* comprises a thermoplastic liner 280 having an inner side wall 200. A reinforcing layer 300 covers the thermoplastic liner 280. The reinforcing layer 300 comprises a plurality of glass filaments that are wrapped helically and circumferentially around the thermoplastic liner 208. The glass filaments are preferably coated with a thermosetting epoxy resin composition. The thermosetting epoxy resin composition consolidates the glass filaments and bonds the same to the thermoplastic liner 280 when cured.

The water treatment vessel 270*a* according to the invention further comprises a supply pipe 170 having a snap-fitting 160 attached at a first end thereof, wherein the snap-fitting 160 engages with and is thereby retained by an upper retaining ring formed in the central opening in the first distributor plate. A second end 310 of the supply pipe 170 is accessible through an aperture 320 formed at a top end of the water treatment vessel 270*a*. The second end 310 of the supply pipe 170 can be connected to a valve assembly (not shown), which includes means for directing water into the vessel to flow through the water treatment media and distributor plate(s) and then up through the supply pipe 170.

In a preferred embodiment of the invention, the water treatment vessel 270*a* further comprises one or more second distributor plates 10*b*, 10*c*. Each one of the second distributor plates preferably comprises a second thermoplastic disk having top side, a bottom side, a central opening and a perimeter edge that is joined to an inner side wall 200 of the thermoplastic liner 280. As in the case of the first distributor plate, a plurality of radial slits are preferably formed in the second disk to define fluid flow passages through the second disk between the central opening and the perimeter edge. The fluid flow passages through the second disk are adapted to swirl fluid flowing through the second disk from the bottom side to the top side in a second circular direction about the central opening. The fluid flow in the second circular direction can be in the same direction as the fluid flow in the first circular direction from the first distributor plate, or can be counter to the flow in the first circular direction. To facilitate the passage of water treatment media past the second distributor plate, the central opening in the second disk has a larger diameter than the outer diameter of the supply pipe. The gap or open space between the central opening in the second disk and the supply pipe is closed off using an access plate that is smaller in diameter than the aperture 320. The access plate includes an axial opening that is dimensioned to sealingly surround the supply pipe and a perimeter edge that is adapted to removable engage with the central opening in the second disk and thereby close off the gap or space. Thus, a first water treatment media is supported by the first distributor plate and a second water treatment media is supported by the second distributor plate. The media can be the same or different materials.

The present invention also provides methods for manufacturing a composite pressure vessel including at least one distributor plate. In a first method, the thermoplastic liner is formed via a blow molding process in which a hollow parison of molten thermoplastic resin in a somewhat tubular shape is inflated using a pressurized gas (e.g., air). The pressurized gas expands the parison and presses it against the walls of a female mold cavity. In accordance with the first method of the invention, the perimeter edge of at least one distributor plate is brought into contact with the inner side wall of thermoplastic resin material to join the perimeter edge thereto. More particularly, the perimeter edge of the at least one distributor plate is brought into contact with the molten thermoplastic resin material while it is cooling and at a time when it is still somewhat above its processing temperature.

When the perimeter edge of the distributor plate is formed of a thermoplastic polymeric material, the perimeter edge is preferably contacted with the thermoplastic resin material that forms the thermoplastic liner when the thermoplastic resin material is at a temperature above the processing temperature of the thermoplastic polymeric material that forms the perimeter edge of the distributor plate. This leads to surface melting, which causes the perimeter edge of the distributor plate to fuse with the thermoplastic resin material that forms the thermoplastic liner, which results in the formation of a very secure bond without the need for any separate adhesive materials or mechanical forms of fixing. The phrase “processing temperature” is used herein to refer to the temperature at which the thermoplastic polymeric material used to form the perimeter edge of the distributor plate is sufficiently soft or molten to fuse with a similar or different thermoplastic material to form a homogeneous or integral joint therewith.

When the perimeter edge of the distributor plate is formed of a material other than a thermoplastic polymeric material or a thermoplastic polymeric material having a processing temperature that exceeds the temperature used to bring the parison to a molten state, the perimeter edge is preferably contacted with the thermoplastic resin material that forms the thermoplastic liner when said thermoplastic resin material is at a temperature above its processing temperature, which allows the thermoplastic resin material to surround and partially encapsulate the perimeter edge of the distributor plate. Again, this results in the formation of a very secure bond without the need for any separate adhesive materials or mechanical forms of fixing.

It will be appreciated that there are a variety of known methods by which a hollow thermoplastic vessel may be formed by blow molding. Any of the known methods that results in the mechanical spreading of the thermoplastic resin material that forms the thermoplastic liner around the distributor plate such that it can be inflated to contact the inner walls of the mold cavity can be used.

Figure 8:
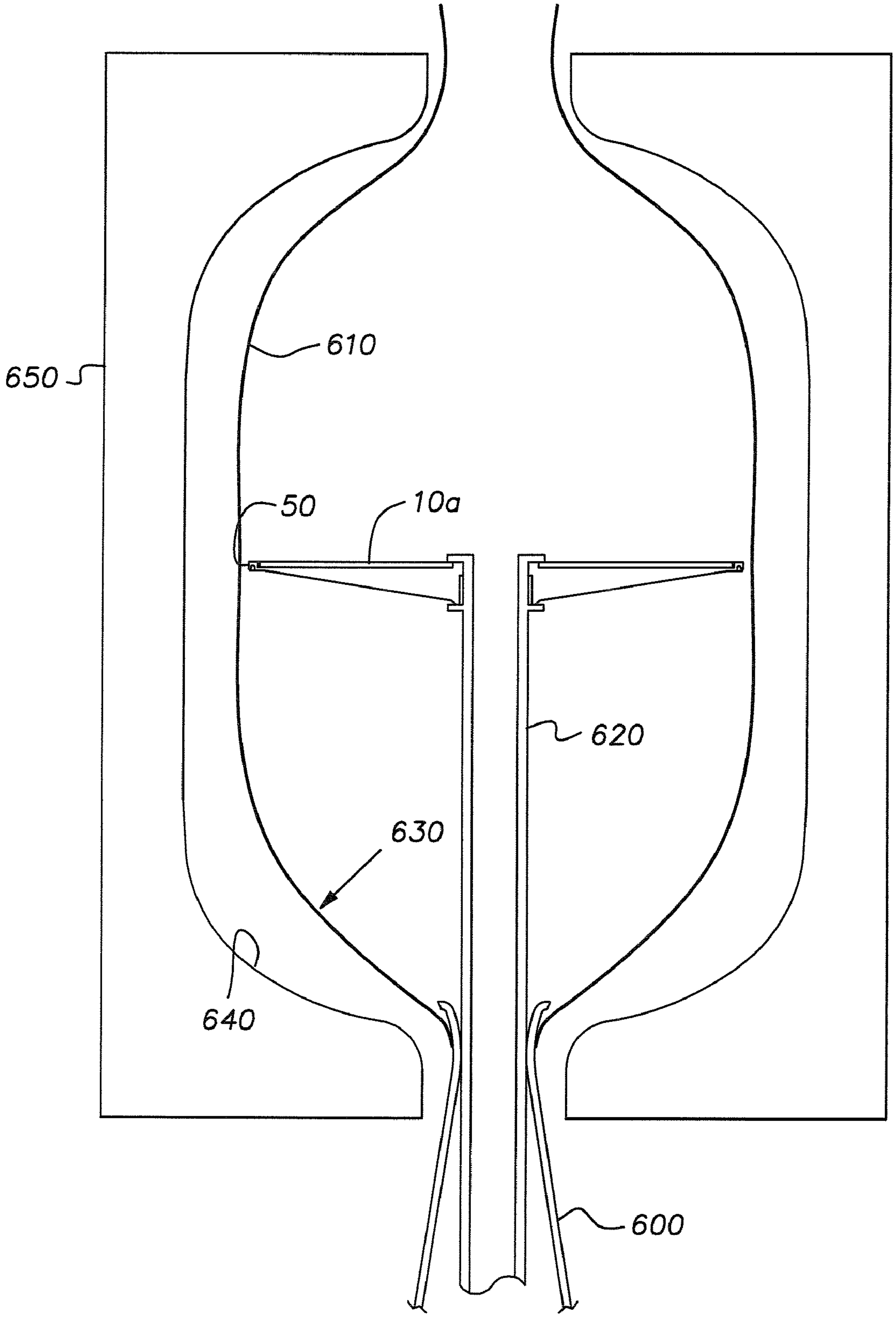
FIG. 8 is a schematic side section view of an exemplary apparatus for forming a thermoplastic liner in accordance with a method of the invention.
Figure 9:
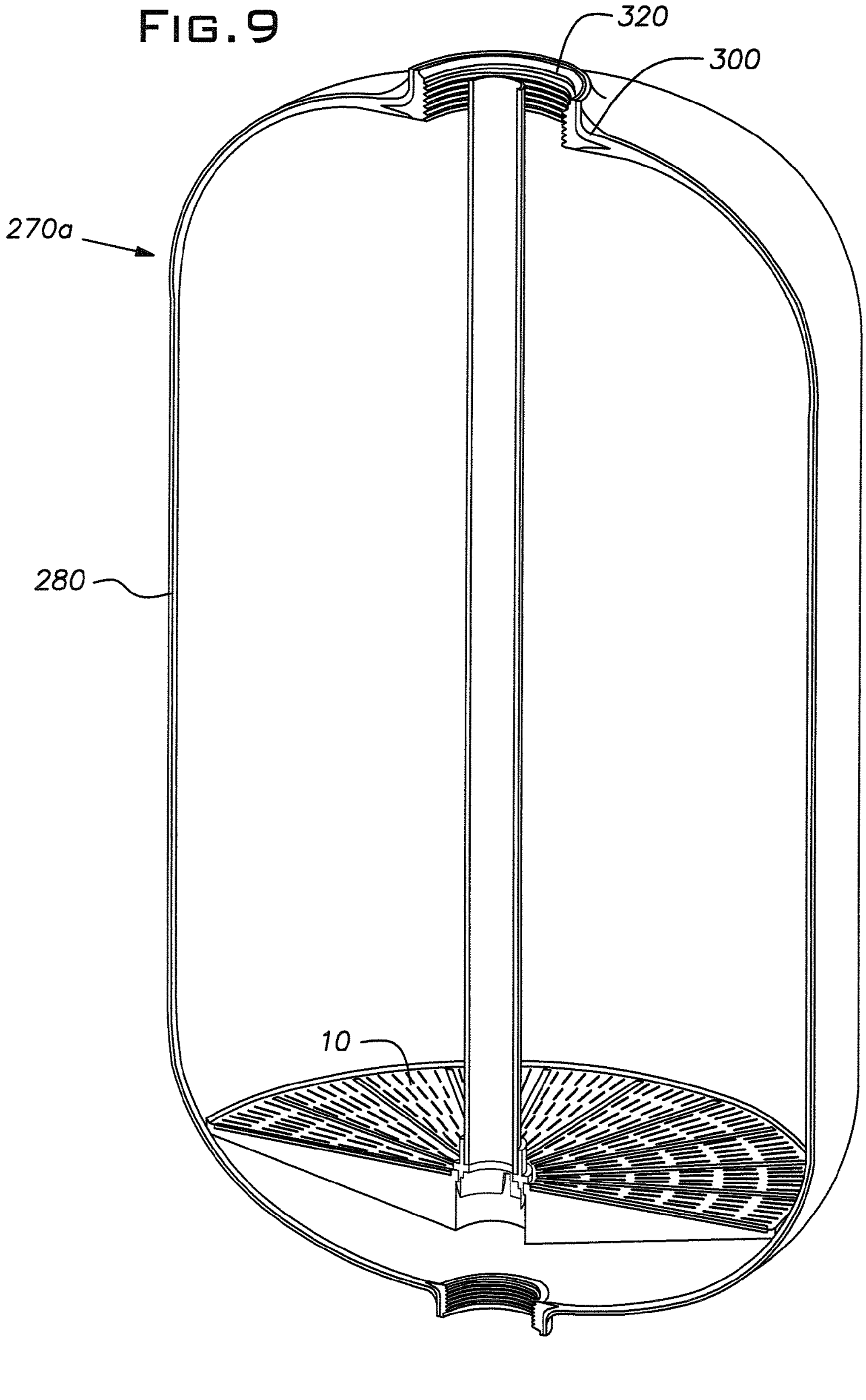
FIG. 9 is a perspective section view of the thermoplastic liner assembly produced in accordance with the apparatus and method illustrated in FIG. 8.

For example, and with reference to FIGS. 8 and 9, a parison stretcher 600 can be used to stretch and guide a molten, hollow, substantially tubular parison 610 around the distributor plate 10*a* as the parison 610 is being inflated with gas. The distributor plate can be mounted to a draw arm 620, which draws the distributor plate 10*a* toward a domed portion 630 of the parison 610 as defined by the inner walls 640 of the mold cavity 650 causing the perimeter edge 50 to contact the molten thermoplastic resin that will form the thermoplastic liner while it is still above its processing temperature. The draw arm 620 releases the distributor plate 10*a* once the temperature of the thermoplastic resin is below the processing temperature and the distributor plate 10*a* has been joined to the inner side wall 200 of the resulting thermoplastic liner 280. FIG. 9 shows the distributor plate 10*a* joined to the inner side wall 200 of a thermoplastic liner 280 after removal from the mold cavity 650.

In some instances, it will be advantageous for one or more second distributor plates to be installed within the composite pressure vessel and for the perimeter edge of such second distributor plates to be joined to a cylindrical inner side wall of the thermoplastic liner. As an alternative to the draw down method previously described, it will be appreciated that the mold cavity can be separated, thus allowing the parison to be stretched around an array of distributor plates mounted on a suitable retaining element (which may, or may not also later serve as a dip tube), which holds the array of distributor plates in the desired final orientation. Once the parison surrounds the distributor plates, the separated mold cavity is closed and the parison is inflated with a pressurized gas. The closing of the mold cavity causes the molten thermoplastic resin that forms the thermoplastic liner to contact the perimeter edge of the distributor plates above the processing temperature, which forms a strong bond as described above.

In a second method, the thermoplastic liner is formed via a rotational molding process in which a measured quantity of thermoplastic polymeric resin (usually in powder form) is loaded into a mold cavity, the mold cavity is heated in a oven as it is rotated biaxially until the thermoplastic polymeric resin has melted and adhered to the inner side walls of the mold cavity and then the mold is cooled to a temperature below which the thermoplastic polymeric resin solidifies thus allowing the molded part to be removed from the mold. In accordance with the second method of the invention, at least one and preferably two or more distributor plates are arranged within the mold cavity such that the perimeter edge of each distributor plate is spaced apart slightly from the inner wall of the mold cavity. Each distributor plate is mounted on a suitable retaining element (which may, or may not also later serve as a dip tube). A protective material such as a high-melting point film, a foil or paper is used to cover the top side and the bottom side of each distributor plate to prevent thermoplastic polymeric resin from becoming lodged in the slits while the mold is being heated and biaxially rotated. As the mold is heated and rotated, the thermoplastic polymeric resin (typically powder) melts and fuses to the inner side walls of the mold cavity. It also melts and fuses to the perimeter edge of each distributor plate. Once the mold is cooled, each distributor plate is bonded to the inner side of the thermoplastic liner. The protective material is then removed from the top side and the bottom side of each distributor plate to expose the slits.

It will be appreciated that the thermoplastic liner, whether formed via a blow-molding process or a rotational-molding process, could be provided with additional apertures or structures. FIG. 9, for example, shows a second aperture 660 provided at a bottom end of the thermoplastic liner beneath the first distributor plate 10*a*. Furthermore, it will be appreciated that blow-molded or rotationally molded thermoplastic liner assemblies could be cut apart, have distributor plates secured to the inner line (e.g., by laser welding, spin-welding, plate welding etc.), and then the cut-apart assembly could be rejoined.

Regardless how the thermoplastic liner assembly is formed, the thermoplastic liner assembly is then wrapped with a reinforcing overwrap layer comprising glass filaments, which are preferably coated with a thermosetting epoxy composition. The glass filaments are wrapped helically and circumferentially around the thermoplastic liner assembly. After the thermosetting epoxy composition has been cured, a supply pipe can be installed (unless the supply pipe was used to support the distributor plate(s) during formation of the thermoplastic liner). The supply pipe can be provided with a snap fitting attached at a first end, which can be inserted through an aperture formed in the thermoplastic liner until the snap fitting engages with and is retained by an upper retaining ring formed in the central opening of the first distributor plate.

The present invention also provides a method for preparing a composite pressure vessel for use as a water treatment apparatus. In accordance with the method, a composite pressure vessel that comprises a thermoplastic liner covered by a reinforcing layer is provided. The reinforcing layer comprises a plurality of glass filaments that are wrapped helically and circumferentially around the thermoplastic liner. The composite pressure vessel further includes at least a first distributor plate comprising a first thermoplastic polymeric disk having a top side, a bottom side, a central opening and a perimeter edge that has been joined to an inner side wall of the thermoplastic liner. The first distributor plate includes a plurality of radial slits, which define fluid flow passages through the first disk between the central opening and the perimeter edge. The fluid flow passages through the first disk are adapted to swirl fluid flowing through the first disk from the bottom side to the top side around the central opening. The composite pressure vessel also includes a supply pipe having a snap-fitting attached at a first end thereof. The snap-fitting is engaged with and is thereby retained by an upper retaining ring formed in the central opening in the first disk. A second end of the supply pipe is accessible through an aperture formed in a top end of the composite pressure vessel. In accordance with the method, a first water treatment media is disposed through the aperture into the composite pressure vessel such that the first water treatment media is supported by the first distributor plate.

In a preferred embodiment, the composite pressure vessel includes one or more second distributor plates comprising a second disk having top side, a bottom side, a central opening and a perimeter edge that have been joined to the inner side wall of the thermoplastic liner above the first distributor plate. As in the case of the first distributor plate, a plurality of radial slits are preferably formed in the second disk to define fluid flow passages through the second disk between the central opening and the perimeter edge. The fluid flow passages through the second disk are adapted to swirl fluid flowing through the second disk from the bottom side to the top side about the central opening. The central opening in the second disk has a larger diameter than the outer diameter of the supply pipe, thereby leaving a gap or open space between the central opening and the supply pipe. The water treatment media is introduced into the vessel such that it passes through the gap or open space and is supported on the first distributor plate. Then, an access plate that is smaller in diameter than the aperture and which has an axial opening that is adapted to sealingly surround the supply pipe, is pushed down the supply pipe until a perimeter edge of the access plate covers or removably engages with the central opening in the second disk, closing off the gap or open space. A second water treatment media is then disposed through the aperture such that the second water treatment media is supported by the second distributor plate. The steps can be repeated for additional distributor plates. A valve assembly is then coupled to the supply pipe. The valve assembly also closes off the aperture.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method for preparing a composite pressure vessel for use as a water treatment apparatus comprising:

providing a composite pressure vessel comprising:

a thermoplastic liner;

a reinforcing layer covering the thermoplastic liner, the reinforcing layer comprising a plurality of glass filaments wrapped helically and circumferentially around the thermoplastic liner;

a lower separator having a top side, a bottom side, a central opening and a perimeter edge that is joined to the thermoplastic liner, wherein a plurality of slits are provided in the lower separator to define fluid flow passages through the lower separator, wherein the plurality of slits are disposed between the central opening and the perimeter edge and have respective longitudinal axes that are radially-aligned with respect to a center of the central opening, and wherein the plurality of radially-aligned slits collectively impart a swirling motion to fluid flowing from the bottom side of the lower separator through the fluid flow passages to the top side of the lower separator, the swirling motion being such that fluid swirls above the top side of the lower separator in a first circular direction relative to the central opening; and a supply pipe having a first end engaged with and retained to the central opening in the lower separator and a second end accessible through an aperture formed in thermoplastic liner; and disposing a first water treatment media through the aperture in the thermoplastic liner into the composite pressure vessel such that the first water treatment media is supported by the lower separator.

2. The method for preparing a composite pressure vessel for use as a water treatment apparatus according to claim 1, wherein the composite pressure vessel further comprises an upper separator having a top side, a bottom side, a central opening and a perimeter edge that is joined to the thermoplastic liner, wherein a plurality of slits are provided in the upper separator to define fluid flow passages through the upper separator, wherein the plurality of slits are disposed between the central opening and the perimeter edge and have respective longitudinal axes that are radially-aligned with respect to a center of the central opening, wherein the plurality of radially-aligned slits collectively impart a swirling motion to fluid flowing from the bottom side of the upper separator through the fluid flow passages to the top side of the upper separator, the swirling motion being such that fluid swirls above the top side of the upper separator in either in the first circular direction or in a second circular direction that is counter to the first circular direction relative to the central opening, and wherein the central opening in the upper separator has a diameter that is larger than a diameter of the supply pipe and smaller than a diameter of the aperture formed in the thermoplastic liner.

3. The method for preparing a composite pressure vessel for use as a water treatment apparatus according to claim 2, wherein the method further comprises: sliding an access plate that is smaller in diameter than the aperture formed in the thermoplastic liner over the supply pipe such that an axial opening in the access plate sealingly surrounds the supply pipe; and removably engaging a perimeter edge of the access plate to close off a space between the supply pipe and the central opening in the upper separator.

4. The method for preparing a composite pressure vessel for use as a water treatment apparatus according to claim 3, wherein the method further comprises: disposing a second water treatment media through the aperture in the thermoplastic liner into the composite pressure vessel such that the second water treatment media is supported by the upper separator.

5. The method for preparing a composite pressure vessel for use as a water treatment apparatus according to claim 1, wherein the plurality of radially-aligned slits provided in the lower separator are arranged in a plurality of concentric rings.

6. The method for preparing a composite pressure vessel for use as a water treatment apparatus according to claim 1, wherein the plurality of radially-aligned slits are arranged such that a greater amount thereof are located towards the perimeter edge than are located towards the central opening.

7. A method for preparing a composite pressure vessel for use as a water treatment apparatus comprising:

providing a composite pressure vessel comprising:

a thermoplastic liner;

a reinforcing layer covering the thermoplastic liner, the reinforcing layer comprising a plurality of glass filaments wrapped helically and circumferentially around the thermoplastic liner;

a lower separator having a top side, a bottom side, a central opening and a perimeter edge that is joined to the thermoplastic liner, wherein a plurality of slits are provided in the lower separator to define fluid flow passages through the lower separator, wherein the plurality of slits are disposed between the central opening and the perimeter edge and have respective longitudinal axes that are radially-aligned with respect to a center of the central opening, and wherein the plurality of radially-aligned slits collectively impart a swirling motion to fluid flowing from the bottom side of the lower separator through the fluid flow passages to the top side of the lower separator, the swirling motion being such that fluid swirls above the top side of the lower separator in a first circular direction relative to the central opening;

a upper separator having a top side, a bottom side, a central opening and a perimeter edge that is joined to the thermoplastic liner, wherein a plurality of slits are provided in the upper separator to define fluid flow passages through the upper separator, wherein the plurality of slits are disposed between the central opening and the perimeter edge and have respective longitudinal axes that are radially-aligned with respect to the center of the central opening, wherein the plurality of radially-aligned slits collectively impart a swirling motion to fluid flowing from the bottom side of the upper separator through the fluid flow passages to the top side of the upper separator, the swirling motion being such that fluid swirls above the top side of the upper separator in either in the first circular direction or in a second circular direction that is counter to the first circular direction relative to the central opening, and wherein the central opening in the upper separator has a diameter that is larger than a diameter of the supply pipe and smaller than a diameter of the aperture formed in the thermoplastic liner; and a supply pipe having a first end engaged with and retained to the central opening in the lower separator, an intermediate portion extending through the central opening in the upper separator and a second end accessible through an aperture formed in thermoplastic liner; and disposing a first water treatment media through the aperture in the thermoplastic liner into the composite pressure vessel and through the central opening in the upper separator outside of the supply pipe such that the first water treatment media is supported by the lower separator;

sliding an access plate that is smaller in diameter than the aperture formed in the thermoplastic liner over the supply pipe such that an axial opening in the access plate sealingly surrounds the supply pipe;

removably engaging a perimeter edge of the access plate to close off a space between the supply pipe and the central opening in the upper separator; and disposing a second water treatment media through the aperture in the thermoplastic liner into the composite pressure vessel such that the second water treatment media is supported by the upper separator.

8. The method for preparing a composite pressure vessel for use as a water treatment apparatus according to claim 7, wherein the plurality of radially-aligned slits provided in the lower separator and the upper separator are arranged in a plurality of concentric rings.

9. The method for preparing a composite pressure vessel for use as a water treatment apparatus according to claim 7, wherein the plurality of radially-aligned slits in the lower separator and the upper separator are arranged such that a greater amount thereof are located towards the perimeter edge than are located towards the central opening.

* * * * *